L. LARSEN.
FLUID FLOW INDICATOR.
APPLICATION FILED JAN. 12, 1916.

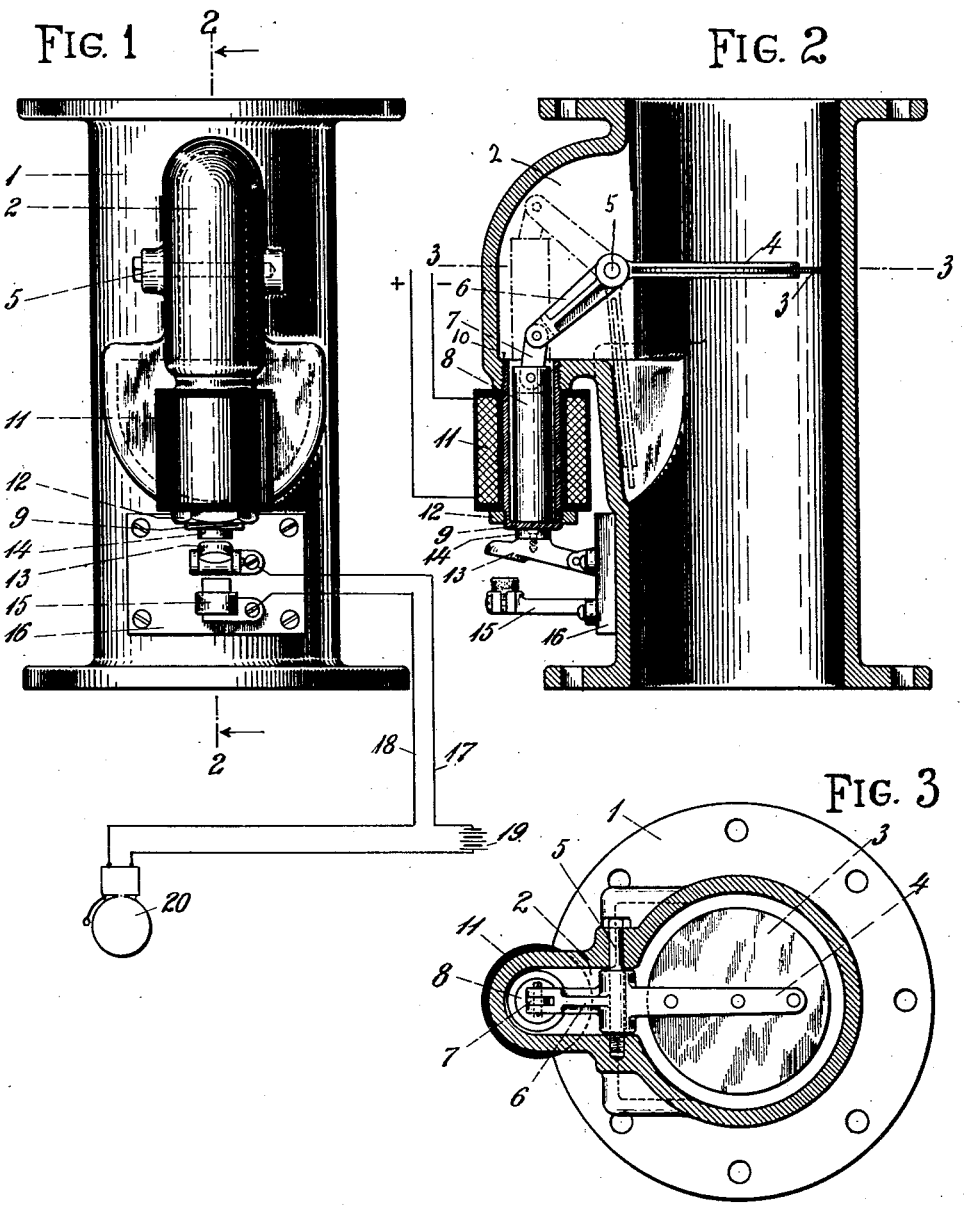

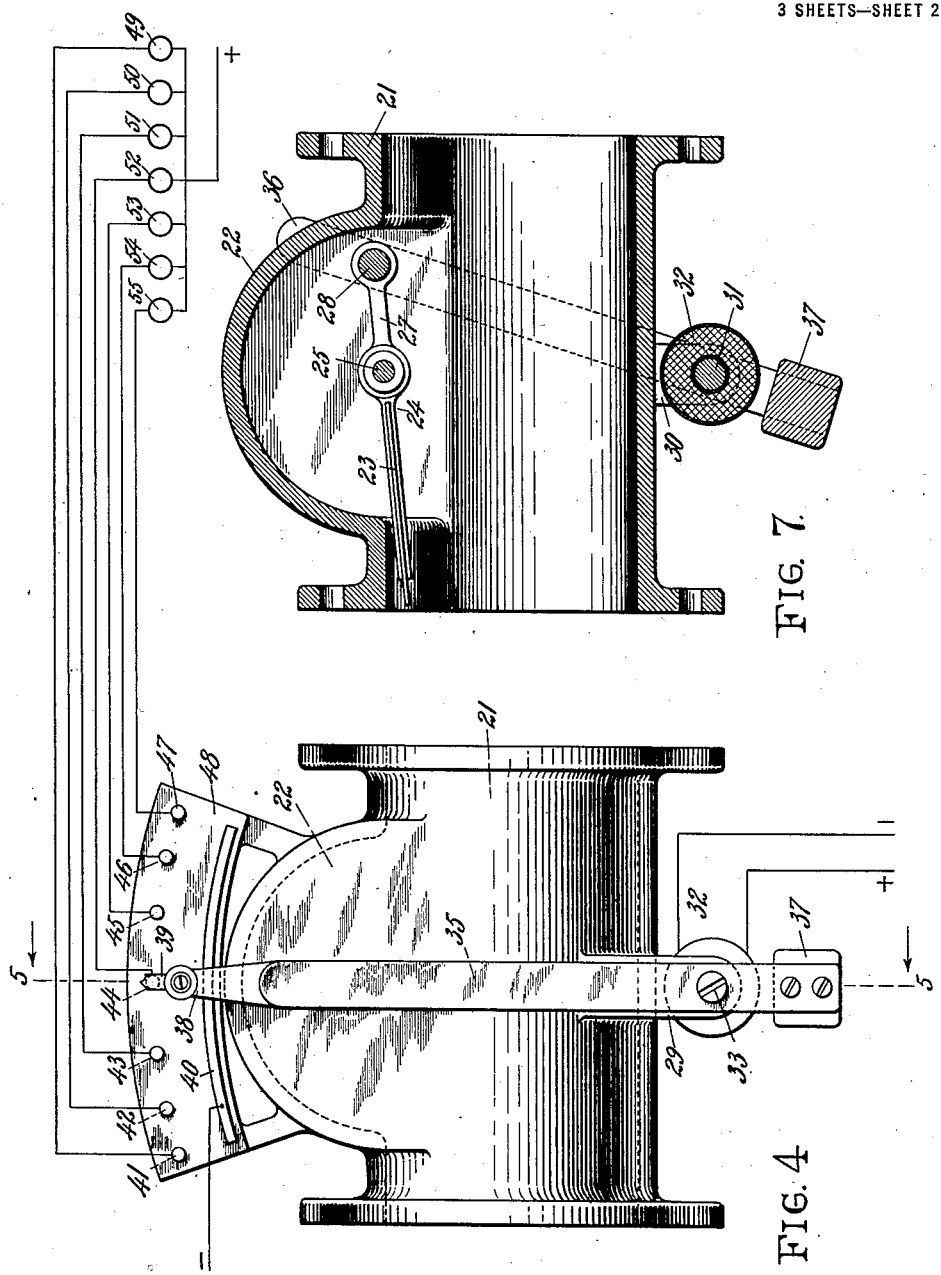

1,292,334.

Patented Jan. 21, 1919.
3 SHEETS—SHEET 3.

Louis Larsen INVENTOR

BY Wm. B. Whitney

ATTORNEY

UNITED STATES PATENT OFFICE.

LOUIS LARSEN, OF BROOKLYN, NEW YORK, ASSIGNOR TO SUNDH ELECTRIC COMPANY, OF NEW YORK, N. Y., A CORPORATION OF NEW YORK.

FLUID-FLOW INDICATOR.

1,292,334.    Specification of Letters Patent.    Patented Jan. 21, 1919.

Application filed January 12, 1916. Serial No. 71,622.

*To all whom it may concern:*

Be it known that I, LOUIS LARSEN, a citizen of the United States, residing in the city of New York, borough of Brooklyn, in the county of Kings and State of New York, have invented certain new and useful Improvements in Fluid-Flow Indicators, of which the following is a specification.

My present invention relates to a fluid flow indicator of a character adapted to indicate, outside, the condition or changes in the condition of a fluid either normally stored and quiescent or normally circulating within a closed container or conduit.

The object of the invention is to provide a cheap, simple, and reliable device which may conveniently be applied to a fluid storage or fluid circulating system and which, whenever abnormal conditions arise therein, will give warning of the same by causing the actuation at some convenient and perhaps remote point outside of an audible or visual or both audible and visual signal.

With this end in view the invention comprises, broadly stated, an open ended casing, adapted to be inserted in and to form a part of a closed container or conduit, within which a movable member is so mounted that its position is dependent upon the movement or lack of movement of the fluid therein and means acting through the closed walls of the casing and rendered operative by changes in the position of the inclosed movable member by which to effect a change in the position of a member movably mounted outside the casing, such, for example, as the contact-arm of a switch controlling a circuit or circuits operating an electric gong, lights, or other audible or visual signals. It also includes the novel features of construction, arrangement, and combination of parts hereinafter more fully described and particularly pointed out in the appended claims.

Two forms of indicators embodying my invention, as adapted for use primarily in connection with a water-sprinkler system, are shown by way of illustration in the accompanying drawings, in which—

Figure 6:
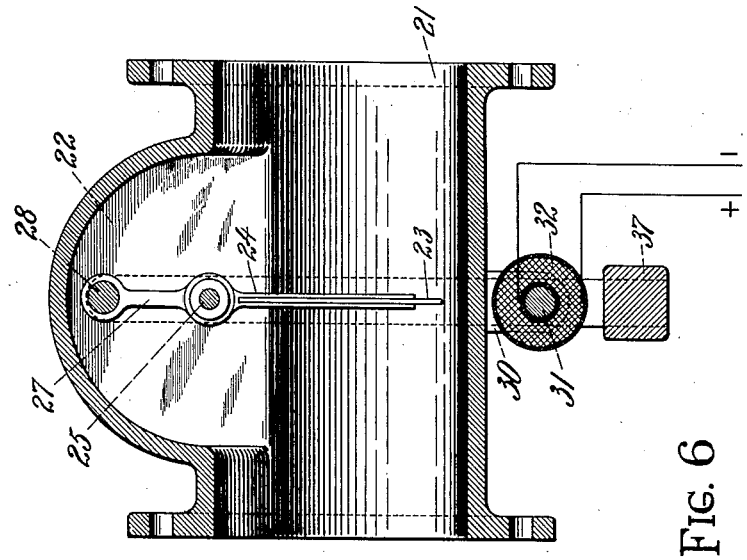
Figure 5:
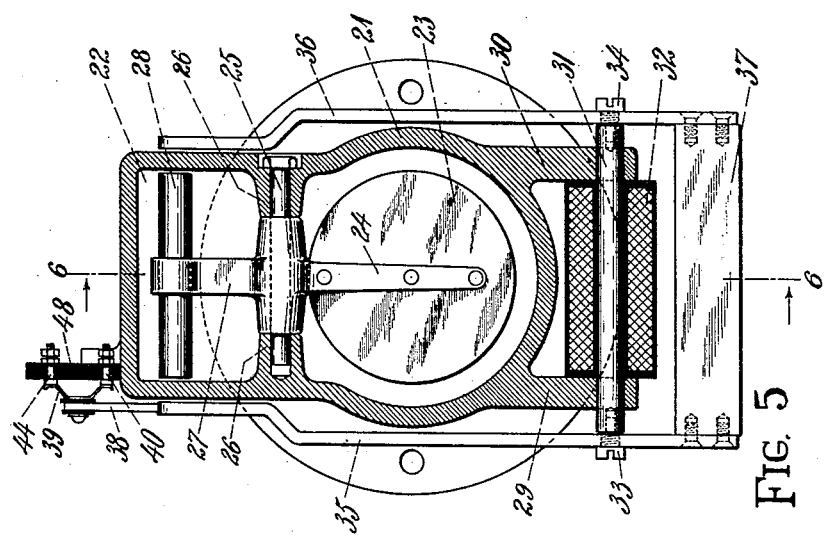

Figure 1 is a front elevation of an indicator for use in a vertical section of a sprinkler system and controlling the battery circuit, shown diagrammatically, of an electric gong; Fig. 2, a vertical section on the line 2 2 of Fig. 1; Fig. 3, a transverse section on the line 3 3 of Fig. 2; Fig. 4, a front elevation of an indicator for insertion in a horizontal section of pipe in a fluid storage or fluid circulating system and controlling the circuits, shown diagrammatically, of a series of electric lights; Fig. 5, a vertical section on the line 5 5 of Fig. 4; Fig. 6, a vertical section on the line 6 6 of Fig. 5; and Fig. 7, a section similar to that of Fig. 6 but showing the movable parts in different positions.

Like reference numerals indicate the same parts throughout the several figures of the drawings.

Referring first to the vertical indicator, shown in Figs. 1, 2, and 3, the cylindrical casing 1, which is upset in front to form a recess or chamber 2, is provided with flanged ends by which it may be bolted to the similarly flanged ends of adjacent sections of pipe. A circular baffle 3, somewhat smaller in diameter than the interior of the casing, is secured to an arm 4, which is pivoted upon a bearing pin 5 mounted and sealed in the walls forming the sides of the upper portion of the recess, and extends inwardly within the casing. A second arm 6, rigidly connected at an angle with the arm 4 and extending outwardly into the recess, is connected at its outer end by a link 7 to the upper end of a cylindrical core or plunger 8, of soft iron or other suitable magnetizable metal. This core fits loosely within and is supported at the limit of its downward movement by the closed lower end of a cylindrical cap 9, of non-magnetizable material such as brass, which at its upper end is screwed into or otherwise tightly secured within, and so closes and permanently seals, an opening 10 through the lower wall of the upper section of the recess, in effect constituting a part of the closed walls of the casing. The normally energized coil 11 of an electromagnet surrounds the cap and is held in place thereon by a nut 12. An electromagnetically actuated switch, comprising a pivoted contact member 13, to which is attached a block 14 of magnetizable metal, and a coöperating fixed contact member 15, is suitably mounted upon an insulating base 16 attached to the outside of the casing, so that the block carried by the movable switch arm may serve as the armature of the electromagnet formed by the magnet coil and its reciprocating magnetic core; and, as shown, the contacts of this switch are respectively connected in the usual or in any suitable way to the two wires 17 and 18 of an electrical circuit, supplied with power from the battery 19 or other source, operating a bell or gong 20.

The operation of the device when connected to a sprinkler system is as follows: Under normal conditions, the quiescent state of the water within the pipes of the system permitting, the reciprocating core of the magnet falls to and rests upon the closed lower end of the cap, raising the baffle to and holding it in a position transverse to the axis of the casing. In this position, the magnetic field is brought so close to the armature block on the movable switch arm that the block is attracted to and held against the lower end of the cap (see Fig. 2), thereby opening and holding open the switch and the circuit operating the gong. In case, however, the pipes are opened below or beyond the casing of the indicator, by fire or otherwise, the flow of water therein will swing the baffle downwardly and raise the reciprocating core, as shown by the dotted lines in Fig. 2, thus introducing an air-gap in the magnetic circuit which will so weaken the magnetic force as to release the armature block thereon and allow the movable switch arm to drop and close the operating circuit of the gong, which will continue to ring until the flow of water through the casing ceases so as to permit the baffle and core to resume by gravity their normal positions to again open the switch.

In the form of indicator hereinabove described, it is assumed that the storage tank of the sprinkler system is supplied through a separate riser or pipe from that in which the indicator is placed, equipped with a check valve if necessary. It is evident that, if there is only one riser both for filling and emptying the tank, the mechanical elements of the indicator shown will have to be modified to meet such a condition.

The modified form of, or horizontal, indicator shown in Figs. 4, 5, 6, and 7 has a casing 21 provided, as before, with flanged ends, and its upper side is upset to form a substantially semi-cylindrical recess or chamber 22 having an axis at right angles to that of the casing. A circular baffle 23, also smaller in diameter than the interior of the casing, is carried by an arm 24 which is pivoted upon a bolt 25 secured at or near the axis of the recess in bosses 26 projecting inwardly from the walls thereof and normally extends downwardly within the casing, while a second arm 27, oppositely disposed to and rigidly connected with the first, carries mounted at its upper end a transverse rod 28 the ends of which extend into close proximity with the inner faces of the parallel front and rear walls of the recess. Within two lugs 29, 30, depending from the lower side of the casing, is mounted a transverse rod 31 which carries, between the lugs, a normally energized magnet coil 32. Upon the opposite ends of this lower rod are pivotally mounted by means of bearing screws 33 34, one in front and the other at the back of the casing, two arms 35 and 36 which at their upper end are brought into close proximity with the outer faces of the front and rear walls of the recess adjacent the ends of the movable rod 28 and at their shorter lower ends are connected together by a weighted bar 37. The lower fixed and upper movable rods and the two arms 35 and 36 are of soft iron or other suitable magnetizable metal and, providing as they do a complete magnetic circuit—from the lower rod over one arm and through a wall of the recess to the upper rod and thence through the other wall of the recess and over the second arm back to the lower rod—for the magnetic field generated therein by the magnet coil, together constitute the swinging core of the electromagnet. The upper end of one arm, the front arm for example, carries an extension 38 upon which is mounted, in a porcelain bushing or otherwise suitably insulated therefrom, a spring bridging contact 39 bearing at one end upon a segmental contact 40 and at its other end successively, one after another as the arm is swung to the right or left, upon a series of segmentally arranged contact points 41 42 43 44 45 46 47, which are mounted upon a suitable panel 48 attached to the upper side of the casing and are connected the segmental contact to one side and each of the contact points through one of a corresponding but preferably reverse series of lamps 49 50 51 52 53 54 55, to the other side of an electric lighting circuit.

In its modified form, as last described, the movable parts of the indicator assume by gravity the positions shown in Figs. 4 and 6 whenever the water within the casing is quiescent, and such a condition will be indicated by the lighting of the central lamp 52 the circuit of which is then completed by the connection of the contact point 44 with the segmental contact 40 over the movable bridging contact 39. But if, on the other hand, the water within the system is in circulation or begins to flow therein, in either direction, the baffle will be swung to the right or to the left as the case may be, to an angle dependent upon the value of the flow, and the pivoted arms outside the casing, attracted to and hence made to follow the movement of the upper movable bar within by the magnetic flux over the magnetic circuit described, will be swung to a corresponding degree in the opposite direction. The movable bridging contact will accordingly be transferred from the central contact point 44 to one of the contacts to the right or left, thereby cutting out the central lamp and lighting one to the left or right thereof. For example, should the baffle be swung from a central position, perpendicular to the axis of the casing, to the position shown in Fig. 7, the bridging contact will be swept from the central contact point 44 over the contact points 45 and 46 to the contact point 47, first cutting out the central lamp 52, then successively cutting in and out the lamps 53 and 54, and finally cutting in the lamp 55, the light in which will indicate that water is flowing through the system from right to left and in full volume. This form of the device is adapted for use in systems in which the water or other fluid is either normally quiescent or normally circulates therein; and it will at all times indicate conditions therein, including, in case of a flow of water, not only the direction but also the value thereof.

While I have shown and described my invention as specially designed for certain specific uses and in what I now regard as the best forms of its embodiment for the purposes in view, it will be understood that it is well adapted to many other uses and that, within the scope of the appended claims, the several parts can be variously modified or replaced by equivalents or omitted entirely without departing from the spirit or sacrificing the advantages thereof.

What I claim as new, and desire to secure by Letters Patent, is—

1. The combination with a fluid container of means for indicating at any convenient point outside the movement or lack of movement of the fluid within the container, said means comprising a baffle pivotally mounted within the the container so that its angular position will be dependent upon the movement or lack of movement of the fluid therein, an electric circuit provided with a control switch located outside the container, and an electromagnet located outside the container and adapted to actuate the switch by means of two movable magnetizable members mounted one inside the container to move with the baffle and the other outside the container to move with the movable member of the switch.

2. The combination with a water-sprinkler system of means for indicating at some convenient point outside a flow of water therein, said means comprising a casing inserted in and forming a part of the system and entirely closed except at its two ends, a baffle pivotally mounted within the casing so that its angular position therein will be dependent upon the movement or lack of movement of the water within the system, an electrical circuit controlled by a switch located outside the casing, and electromagnetic means rendered operative by a change in the angular position of the baffle within the casing for causing the actuation of the control switch and including a magnet coil located outside the casing and a magnetic circuit therefor having as parts thereof two movable magnetizable members mounted one inside the casing to move with the baffle and the other outside the casing to move with the movable contact.

3. In combination, a casing open at its ends and adapted to be inserted within and to form a part of a fluid container, a baffle pivotally mounted within the casing so that its angular position therein will be dependent upon the movement or lack of movement of fluid therein, an electric switch located outside the casing and comprising a plurality of stationary contacts and a co-operating movable contact, and means controlled by the angular position of the baffle within the casing for moving the movable switch contact into engagement with one or another of the stationary switch contacts which means comprise an electromagnet with a part of its metallic magnetic circuit mounted outside the casing to move with the movable switch contact and another part of its metallic magnetic circuit mounted within the casing to move with the baffle therein.

4. In combination, a cylindrical casing open at its ends and provided with a substantially semi-cylindrical recess with its axis at right angles to the axis of the casing and with parallel end walls, a baffle pivoted at or near the axis of the recess to swing within the casing, means tending normally to hold the baffle in a position at right angles to the axis of the casing, an electric switch mounted outside the casing, and an electromagnetic circuit which operatively connects the baffle with the movable member of the switch and comprises as parts thereof a bar of magnetizable metal carried by the baffle and swinging within the recess parallel to its axis and with ends in proximity to the inner faces of the end walls thereof and two arms of magnetizable metal pivotally mounted outside the casing to swing on opposite sides thereof in close proximity to the outer faces of the end walls of the recess opposite the ends of the magnetizable bar.

5. In combination, a cylindrical casing open at its ends and provided with a substantially semi-cylindrical recess with axis at right angles to the axis of the casing and with parallel end walls, a baffle pivoted at or near the axis of the recess to swing within the casing, a rod of magnetizable metal mounted integrally with the baffle to swing within the recess parallel to its axis and with ends in proximity to the inner faces of the end walls thereof, a rod of magnetizable metal with surrounding magnet coil mounted outside the casing opposite the recess and parallel to its axis, two arms of magnetizable metal pivotally mounted upon the two ends of the last mentioned rod respectively with free ends adapted to swing in close proximity to the outer faces of the end walls of the recess opposite the ends of the first mentioned rod, means tending normally to hold the baffle in a position at right angles to the axis of the casing, and an electric switch comprising a series of contact points mounted upon a panel attached to the outside of the casing and a coöperating contact member carried by one of the said swinging arms.

LOUIS LARSEN.

In presence of—
  WM. B. WHITNEY,
  MAY FREVERT.